US011916264B2

(12) United States Patent
Restrepo et al.

(10) Patent No.: US 11,916,264 B2
(45) Date of Patent: *Feb. 27, 2024

(54) LOW-COST, HIGH-PERFORMANCE COMPOSITE BIPOLAR PLATE

(71) Applicant: Garmor Inc., Orlando, FL (US)

(72) Inventors: David Restrepo, Orlando, FL (US); Matthew McInnis, Orlando, FL (US); Sean Christiansen, Orlando, FL (US); Jeff Bullington, Orlando, FL (US)

(73) Assignee: Asbury Graphite of North Carolina, Inc., Lumberton, NC (US)

( * ) Notice: Subject to any disclaimer, the term of this patent is extended or adjusted under 35 U.S.C. 154(b) by 530 days.

This patent is subject to a terminal disclaimer.

(21) Appl. No.: 17/025,609

(22) Filed: Sep. 18, 2020

(65) Prior Publication Data

US 2021/0005906 A1 Jan. 7, 2021

Related U.S. Application Data

(63) Continuation of application No. 15/758,524, filed as application No. PCT/US2016/052292 on Sep. 16, 2016, now Pat. No. 11,038,182.

(60) Provisional application No. 62/221,157, filed on Sep. 21, 2015.

(51) Int. Cl.
| | |
|---|---|
| *H01M 8/00* | (2016.01) |
| *H01M 8/0263* | (2016.01) |
| *B29C 48/00* | (2019.01) |
| *C08K 3/04* | (2006.01) |
| *B29B 7/88* | (2006.01) |
| *B29C 43/00* | (2006.01) |
| *C08J 3/20* | (2006.01) |
| *C08K 7/06* | (2006.01) |
| *H01M 8/0213* | (2016.01) |
| *H01M 8/0221* | (2016.01) |
| *H01M 8/0226* | (2016.01) |
| *H01M 8/1018* | (2016.01) |
| *H01M 8/10* | (2016.01) |
| *B29K 23/00* | (2006.01) |
| *B29K 105/00* | (2006.01) |
| *B29K 507/04* | (2006.01) |
| *B29K 509/02* | (2006.01) |
| *B29L 31/34* | (2006.01) |

(52) U.S. Cl.
CPC ........... *H01M 8/0263* (2013.01); *B29B 7/885* (2013.01); *B29C 43/003* (2013.01); *B29C 48/022* (2019.02); *C08J 3/203* (2013.01); *C08K 3/04* (2013.01); *C08K 3/041* (2017.05); *C08K 3/042* (2017.05); *C08K 3/046* (2017.05); *C08K 7/06* (2013.01); *H01M 8/0213* (2013.01); *H01M 8/0221* (2013.01); *H01M 8/0226* (2013.01); *H01M 8/1018* (2013.01); *B29K 2023/00* (2013.01); *B29K 2105/251* (2013.01); *B29K 2507/04* (2013.01); *B29K 2509/02* (2013.01); *B29K 2995/0005* (2013.01); *B29L 2031/3468* (2013.01); *C08J 2323/20* (2013.01); *C08K 2201/001* (2013.01); *C08K 2201/011* (2013.01); *H01M 2008/1095* (2013.01); *H01M 2300/0082* (2013.01)

(58) Field of Classification Search
CPC ............. H01M 8/0263; H01M 8/0213; H01M 8/0221; H01M 8/0226; H01M 8/1018; H01M 2008/1095; H01M 2300/0082; B29B 7/885; B29C 43/003; B29C 48/022; C08J 3/203; C08J 2323/20; C08K 3/04; C08K 3/041; C08K 3/042; C08K 3/046; C08K 7/06; C08K 2201/001; C08K 2201/011; B29K 2023/00; B29K 2105/251; B29K 2507/04; B29K 2509/02; B29K 2995/0005; B29L 2031/3468
See application file for complete search history.

(56) References Cited

U.S. PATENT DOCUMENTS

| | | | |
|---|---|---|---|
| 2,459,520 | A | 1/1949 | Greenshields |
| 4,046,863 | A | 9/1977 | Kobayashi et al. |
| 5,057,370 | A | 10/1991 | Krieg et al. |
| 5,360,582 | A | 11/1994 | Boyd et al. |
| 5,501,934 | A | 3/1996 | Sukata et al. |
| 5,506,061 | A | 4/1996 | Kindl et al. |
| 5,509,993 | A | 4/1996 | Hirschvogel |
| 5,583,176 | A | 12/1996 | Haberle |
| 6,004,712 | A | 12/1999 | Barbetta et al. |
| 6,172,163 | B1 | 1/2001 | Rein et al. |
| 6,348,279 | B1 | 2/2002 | Saito et al. |
| 6,436,567 | B1 | 8/2002 | Saito et al. |

(Continued)

FOREIGN PATENT DOCUMENTS

| | | |
|---|---|---|
| CN | 101462889 A | 6/2009 |
| CN | 102021633 A | 4/2011 |

(Continued)

OTHER PUBLICATIONS

CN 102586952 Google translation 7 pp.

(Continued)

*Primary Examiner* — Nicholas P D'Aniello

(74) *Attorney, Agent, or Firm* — Edwin S. Flores; Daniel J. Chalker; Chalker Flores, LLP

(57) ABSTRACT

This invention describes a low-cost, lightweight, high-performance composite bipolar plate for fuel cell applications. The composite bipolar plate can be produced using stamped or pressed into the final form including flow channels and other structures prior to curing.

12 Claims, No Drawings

(56) References Cited

U.S. PATENT DOCUMENTS

| | | |
|---|---|---|
| 7,005,205 B1 | 2/2006 | Gyoten et al. |
| 7,231,084 B2 | 6/2007 | Tang et al. |
| 7,329,698 B2 | 2/2008 | Noguchi et al. |
| 7,623,340 B1 | 11/2009 | Song et al. |
| 8,168,964 B2 | 5/2012 | Hiura et al. |
| 8,216,541 B2 | 7/2012 | Jang et al. |
| 8,580,132 B2 | 11/2013 | Lin et al. |
| 9,758,379 B2 | 9/2017 | Blair |
| 9,802,206 B2 | 10/2017 | Kitaura et al. |
| 10,138,969 B2 | 11/2018 | Hattori et al. |
| 10,287,167 B2 | 5/2019 | Blair |
| 11,038,182 B2* | 6/2021 | Restrepo ............ H01M 8/0263 |
| 11,214,658 B2* | 1/2022 | Restrepo ............ C01B 32/198 |
| 2002/0008031 A1 | 1/2002 | Barsukov et al. |
| 2002/0119358 A1 | 8/2002 | Rock |
| 2002/0182387 A1 | 12/2002 | Mercuri et al. |
| 2004/0000735 A1 | 1/2004 | Gilbert, Sr. et al. |
| 2004/0033189 A1 | 2/2004 | Kaschak et al. |
| 2004/0071896 A1 | 4/2004 | Kang |
| 2004/0209150 A1 | 10/2004 | Rock |
| 2005/0041373 A1 | 2/2005 | Pruss |
| 2005/0191471 A1 | 9/2005 | Haggquist |
| 2005/0196636 A1 | 9/2005 | Kawakami et al. |
| 2005/0208319 A1 | 9/2005 | Finley et al. |
| 2007/0219336 A1 | 9/2007 | Ito |
| 2007/0284557 A1 | 12/2007 | Gruner et al. |
| 2008/0048152 A1 | 2/2008 | Jang et al. |
| 2008/0206124 A1 | 8/2008 | Jang et al. |
| 2008/0279710 A1 | 11/2008 | Zhamu et al. |
| 2008/0318110 A1 | 12/2008 | Budinski et al. |
| 2009/0017211 A1 | 1/2009 | Cruner et al. |
| 2009/0092747 A1 | 4/2009 | Zhamu et al. |
| 2009/0140801 A1 | 6/2009 | Ozyilmaz et al. |
| 2009/0215953 A1 | 8/2009 | Hwang et al. |
| 2009/0224420 A1 | 9/2009 | Wilkinson |
| 2009/0241496 A1 | 10/2009 | Pintault et al. |
| 2010/0006445 A1 | 1/2010 | Tomatschger |
| 2010/0028681 A1 | 2/2010 | Dai et al. |
| 2010/0055025 A1 | 3/2010 | Jang et al. |
| 2010/0055458 A1 | 3/2010 | Jang et al. |
| 2010/0056819 A1 | 3/2010 | Jang et al. |
| 2010/0092809 A1 | 4/2010 | Drzal et al. |
| 2010/0143732 A1 | 6/2010 | Swift et al. |
| 2010/0147188 A1 | 6/2010 | Mamak et al. |
| 2010/0151318 A1 | 6/2010 | Lopatin et al. |
| 2010/0209731 A1 | 8/2010 | Humano |
| 2010/0239870 A1 | 9/2010 | Bowen |
| 2010/0296253 A1 | 11/2010 | Miyamoto et al. |
| 2010/0317790 A1 | 12/2010 | Jang et al. |
| 2011/0017585 A1 | 1/2011 | Zhamo et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0120347 A1 | 5/2011 | Chung et al. |
| 2011/0143018 A1 | 6/2011 | Peng et al. |
| 2011/0159372 A1 | 6/2011 | Zhamu et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0065309 A1 | 3/2012 | Agrawal et al. |
| 2012/0077017 A1 | 3/2012 | Buresch |
| 2012/0107562 A1 | 3/2012 | Bolotin et al. |
| 2012/0129736 A1 | 5/2012 | Tour et al. |
| 2012/0184065 A1 | 7/2012 | Gharib et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0196123 A1 | 8/2013 | Sarver et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0264041 A1 | 10/2013 | Zhamu et al. |
| 2013/0272950 A1 | 10/2013 | Yun et al. |
| 2013/0330833 A1 | 12/2013 | Ruiz et al. |
| 2014/0000751 A1 | 1/2014 | Kagumba et al. |
| 2014/0018480 A1 | 1/2014 | Lee et al. |
| 2014/0030590 A1 | 1/2014 | Wang et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0284253 A1 | 10/2015 | Zhamu et al. |
| 2015/0368436 A1 | 12/2015 | Chiu et al. |
| 2016/0016803 A1 | 1/2016 | Stoltz et al. |
| 2016/0083552 A1 | 3/2016 | Nosker et al. |
| 2016/0144339 A1 | 5/2016 | Kim et al. |
| 2016/0216629 A1 | 7/2016 | Grinwald |
| 2017/0092960 A1* | 3/2017 | Serov ...................... H01M 4/92 |
| 2017/0166722 A1 | 6/2017 | Zhamu et al. |
| 2017/0233290 A1 | 8/2017 | Christiansen et al. |
| 2019/0051903 A1 | 2/2019 | Manabe et al. |

FOREIGN PATENT DOCUMENTS

| | | |
|---|---|---|
| CN | 102586952 A | 7/2012 |
| CN | 102719719 A | 7/2012 |
| CN | 103058541 A | 4/2013 |
| CN | 103130436 A | 6/2013 |
| CN | 103215693 A | 7/2013 |
| CN | 103408880 A | 11/2013 |
| CN | 103545536 A | 1/2014 |
| CN | 10356997 A | 2/2014 |
| CN | 103757823 A | 4/2014 |
| CN | 103819915 A | 5/2014 |
| CN | 103962102 A | 8/2014 |
| CN | 104319372 A | 1/2015 |
| CN | 104446176 A | 3/2015 |
| CN | 104844930 A | 4/2015 |
| CN | 106700356 A | 5/2017 |
| CN | 108276576 A | 7/2018 |
| EP | 0949704 A1 | 10/1999 |
| EP | 1227531 A | 7/2002 |
| EP | 2560228 A1 | 2/2013 |
| GB | 723598 A | 2/1955 |
| JP | S6169853 A | 4/1986 |
| JP | 64009808 A | 1/1989 |
| JP | 2012007224 A | 1/2012 |
| JP | 2012136567 A | 7/2012 |
| KR | 20110119429 A | 11/2011 |
| KR | 20130048741 A | 4/2013 |
| KR | 20130090979 A | 8/2013 |
| KR | 1020150026092 | 3/2015 |
| KR | 1020170019802 | 2/2017 |
| RU | 2456361 C1 | 7/2012 |
| WO | 2009032069 A1 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011078639 A2 | 6/2011 |
| WO | 2011086391 A1 | 7/2011 |
| WO | 2011087301 A2 | 7/2011 |
| WO | 2011099761 A2 | 8/2011 |
| WO | 2011162727 A1 | 12/2011 |
| WO | 2012058553 A2 | 5/2012 |
| WO | 2012148880 A2 | 11/2012 |
| WO | 2012177864 A1 | 12/2012 |
| WO | 2013001266 A1 | 1/2013 |
| WO | 2013096990 A1 | 7/2013 |

(56) References Cited

FOREIGN PATENT DOCUMENTS

| | | |
|---|---|---|
| WO | 2014062226 A1 | 4/2014 |
| WO | 2014080144 A1 | 5/2014 |
| WO | 2014104446 A1 | 7/2014 |
| WO | 2014138587 A1 | 9/2014 |
| WO | 2014210584 A1 | 12/2014 |
| WO | 2016154057 A1 | 9/2016 |
| WO | 2017154533 A1 | 9/2017 |

OTHER PUBLICATIONS

CN 103545536 Google translation 5 pp.
Extended European Search Report for EP 19862892.7 dated Oct. 12, 2021, 11 pp.
Osicka, et al., "Light-Induced and Sensing Capabilities of SI-ATRP Modified Graphene Oxide particles in Elastomeric Matrix," Active and Passive Smart Structures and Integrated Systems 2017, vol. 10164, 1016434, doi: 10.1117/12.2260703, 10.pp.
Wang, Y., et al., "Kevlar oligomer functionalized graphene for polymer composites," Polymer, 52, Juen 15, 2011, 3661-3670.
Extended European Search Report for EP 16849382.3 dated Apr. 30, 2019, 10 pp.
Extended European Search Report for EP 17865997.5 dated Jul. 22, 2019, 7 pp.
International Search Report and Written Opinion for PCT/US2019/051405 from KIPO dated Jan. 3, 2020.
Kaur, S., et al., "Enhanced thermal transport at covalently functionalized carbon nanotube array interfaces," Nature Communications, Jan. 22, 2014, pp. 1-8.
Kirschner, M., "Ozone," Ullmann's Encyclopedia of Industrial Chemistry, vol. 25, 2012, pp. 637-644.
Maguire, J. A., et al., "Efficient low-temperature thermal functionalization of alkanes. Transfer dehydrogenation catalyzed by Rh(PMe3)2Cl(CO) in solution under a high-pressure hydrogen atmosphere," J. Am. Chem. Soc., Aug. 1, 1991, vol. 113:17, pp. 6706-6708.
Minus, M., et al., "The Processing, Properties, and Structure of Carbon Fibers," JOM, Feb. 2005, pp. 52-58.
Pauling, L., General Chemistry, Chapter 15, "Oxidation-Reduction Reactions. Electrolysis," Dover Publications, Inc., 1970, 41 pp.
Polymers: A Properties Database, "Poly(ethylene terphthalate)", Chemnetbase, downloaded from http://poly.chemnetbase.com, Jan. 24, 2016, 5 pp.
Babak, F., et al., "Preparation and Mechanical Properties of Graphene Oxide: Cement Nanocomposites," The Scientific World Journal, vol. 2014, ID 276323, 10 pp.
Rahman, M.A., et al., "The effect of residence time on the physical characterists of PAN-based fibers produced using a solvent-free coagulation process," Materials Science and Engineering A 448, 2007, pp. 275-280.
Wang, Q., et al., "Nanostructures and Surface Nanomechanical Properties of Polyacrylonitrile/Graphene Oxide Composite Nanofibers by Electrospinning," J. Appl. Polym. Sci., 2013.
Xia, et al., "Effects of resin content and preparing conditions on the properties of polyphenylene sulfide resin/graphite composite for bipolar plate," Journal of Power Sources, vol. 178, Dec. 5, 2007, pp. 363-367.
Chemical Book, <<https://www.chemicalbook.com/ChemicalProductProperty_EN_CB8295389.htm>>, year 2017.
Chemical Book, <<https://www.chemicalbook.com/ProductChemical PropertiesCB8123794_EN.htm>>, year 2017.
Gong, et al., "Optimization of the Reinforcement of Polymer-Based Nanocomposites with Graphene," ECCM15—15th European Conference on Composite Materials, Venice, Italy, Jun. 24-28, 2012.
Gulotty, R., et al., "Effects of Functionalization on Thermal Properties of Single-Wall and Multi-Wall Carbon Nanotube—Polymer Nancomposites," UC Riverside—Polytechnic of Turin (2013), 25 pp.
Porter, Roger S. et al., "Property Opportunities with Polyolefins, A Review Preparations and Applications of High Stiffness and Strength by Uniaxial Draw," Polymer, 35:23, 1994, pp. 4979-4984.
Song, M., et al., "The Effect of Surface Functionalization on the Immobilization of Gold Nanoparticles on Graphene Sheets," Journal of Nanotechnology, vol. 2012, Art. ID 329318, Mar. 28, 2012, 5 pp.
Zheng, H., et al., "Graphene oxide-poly (urea-formaldehyde) composites for corrosion protection of mild steel," Corrosion Science, Apr. 27, 2018, 139, pp. 1-12.
Extended European Search Report for EP 15834377.2 dated Mar. 9, 2018, 8 pp.
Extended European Search Report for EP 16780450.9 dated Jul. 13, 2018, 18 pp.
Wu, Q., et al., "Suprecapacitors Based on Flexible Graphene/Polyaniline Nanofiber Composite Films," ACS Nano (2010), 4(4):1963-1970.
Academic Press Dictionary of Science and Technology ("Flake", p. 1, obtained online Aug. 19, 2016).
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Ebinezar, et al., "Analysis of hardness test for aluminum carbon nanotube metal matrix and graphene," Indian Journal of Engineering, vol. 10, No. 21, 2014, pp. 33-39.
Extended European Search Report and Opinion for EPO 12844344.7 dated Oct. 22, 2015, 8 pp.
Extended European Search Report and Opinion for EPO 14759787.6 dated Oct. 6, 2016, 13 pp.
Extended European Search Report and Opinion for EPO 14760912.7 dated May 11, 2016, 8 pp.
Fang, M., et al., ""Covalent polymer functionalization of graphenenanosheets and mechanical properties of composites" Journal of Materials Chemistry, 2009, vol. 19, No. 38, pp. 7098-7105".
Feng, H., et al., "A low-temperature method to produce highly reduced graphene oxide," Nature Communications, Feb. 26, 2013, 8 pp.
FMC, Persulfates Technical Information, (http://ww.peroxychem.com/media/90826/aod_brochure_persulfate.pdf, downloaded on Jan. 19, 2017) 16 pp.
Herman, A., et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.

(56) References Cited

OTHER PUBLICATIONS

International Search Report and Written Opinion for PCT/US2017/027231 from KIPO dated Jul. 11, 2017, 18 pp.
Jeon, I., et al., "Edge-carboxylated graphene nanosheets via ball milling. Proceedings of the National Academy of Sciences of the United States of AmericaPNAS, Apr. 10, 2012, vol. 109, No. 15, pp. 5588-5593.".
Liu, Y. B., et al., "Recent development in the fabrication of metal matrix-particulate composites using powder metallurgy techniques," Journal of Materials Science, vol. 29, No. 8, 1994, pp. 1999-2007.
McQuarrie (2011, General Chemistry (4th Edition). University Science Books, Appendix G "Standard Reduction Voltages for Aqueous Solutions at 25C, p A-34 to A-37 and also p. 949, Table 25.3. Online version available at:http://app.knovel.com/hotlink!toc/id:kpGCE00013/general-chemistry-4th/general-chemistry-4th)".
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and A1203 particulate composites by powder metallurgy technique," Materials Letters, 2002, vol. 53, No. 4, pp. 244-249.
Ong, T. S., et al., "Effect of atmosphere on the mechanical milling of natural graphite," Carbon, 2000, vol. 38, No. 15, pp. 2077-285.
Rafiee, M. et al., "Fracture and fatigue in graphene nanocomposites." Small, 2010, vol. 6, No. 2, pp. 179-183.
Steurer, P., et al., ""Functionalized graphenes and thermoplasticnanocomposites based upon expanded graphite oxide."" Macromolecular Rapid Communications, 2009, vol. 30, Nos. 4-5, pp. 316-327.
Szabo, T., et al., "Evolution of Surface Functional Groups in a Series of Progressively Oxidized Graphite Oxides," Chem. Mater., vol. 18, Mar. 29, 2006, pp. 2740-2749.
Taeseon, H., et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fId=26, accessed Jan. 19, 2017, 2 pp.
Wang, X. et al., ""In situ polymerization of graphene nanosheets andpolyurethane with enhanced mechanical and thermal properties."" Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Films Prepared by Electrophoretic Deposition." Advanced Materials, 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.
Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.
Extended European Search Report for EP 16765526.5 dated Feb. 13, 2018, 7 pp.
Extended European Search Report for EP 16769452.0 dated Mar. 1, 2018, 9 pp.
Extended European Search Report for EP 16780450.9 dated Apr. 19, 2018, 17 pp.
Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.
Li, Y., et al., "Hybridizing wood cellulose and graphene oxide toward high-performance fibers," NPG Asia Materials, 7, Jan. 9, 2015, 14 pp.
Tissera, N., et al., "Hydrophobic cotton textile surfaces using an amphiphilic graphene oxide (GO) coating," Applied Surface Science, 324, Nov. 4, 2014 (2015), pp. 455-463.
Extended European Search Report for EP 23154238.2 dated Jun. 13, 2023, 7 pp.

\* cited by examiner

LOW-COST, HIGH-PERFORMANCE COMPOSITE BIPOLAR PLATE

CROSS-REFERENCE TO RELATED APPLICATIONS

This application is a continuation of U.S. patent application Ser. No. 15/758,524 filed on Mar. 8, 2018, now U.S. Pat. No. 11,038,182 issued on Jun. 15, 2021, which is a U.S. National Stage Application of International Application No. PCT/US2016/052292, filed on Sep. 16, 2016 claiming the priority to U.S. Provisional Application No. 62/221,157 filed on Sep. 21, 2015, the contents of each of which are incorporated by reference herein.

TECHNICAL FIELD OF THE INVENTION

The present invention relates in general to the field of low-cost, high-performance composites.

BACKGROUND OF THE INVENTION

Without limiting the scope of the invention, its background is described in connection with compound conductive materials.

Bipolar plates are an important key component of fuel cells primarily because of their ability to simultaneously provide a thermally and electrically conductive plate that also distributes and separates gases. Significant effort is aimed at reducing the weight and cost of bipolar plates for fuel cell applications. In the present investigation, efforts were made to develop composite bipolar plates by using methods and materials that allow compression stamping/pressing processes to achieve performance and cost goals. Today, most bipolar plates are composed entirely of graphite while progress is being made to one-day use lightweight composite bipolar plates made of graphite and a polymer filler. Thus far, graphite has been an ideal candidate for composing bipolar plates because of its mechanical, chemical, thermal, gas barrier, electrical, flame retardant and other properties.

Graphite is commonly used to enhance strength, electrical, and thermal conductivity of a composite material. Graphite has been used as a component in a wide number of composite materials including resins, epoxies, and polymers. Composite plates can be prepared by using different reinforcing fillers such as natural graphite, synthetic graphite, carbon black, or carbon fibers with phenolic resin as a polymer matrix precursor in its liquid and powder form. The composite plates prepared with appropriate proportion of components were characterized for physical and mechanical properties. It is found that by changing the component amounts for composite bipolar plates, improvements can be achieved that increase performance and decrease cost compared to that of pure graphite bipolar plates.

SUMMARY OF THE INVENTION

The method herein enables the dispersion/compounding of graphite, carbon black, graphene oxide or any additive with a polymeric component that can be extruded, stamped, or otherwise mass-produced into a bipolar plate. The particles of the one material are coated with the material of another conductive component or multiple conductive components using a milling process. The coated surface of the material creates conductive connective pathways through the volume of the final composite structure. By controlling the ratio of the components, one can achieve low density, high electrical conductivity, and surface hardness required for mass process by extrusion stamping or other mass manufacturing process.

In one embodiment, the present invention includes a method of making a conductive, composite bipolar plate made of coated particles for making a composite material that enhances a property of the composite material, comprising: providing a powdered component called a powdered host particle; providing a second powdered component called a conductive additive that comprises a softening or melting temperature higher than the melting point of the powdered host particle; inputting said powdered host particle and said conductive additive into a ball mill; and ball milling said powdered host and said conductive additive for a milling time to sufficiently mix but not melt the powdered host particle into a conductive host-additive particle. In one aspect, the powdered host particle is a powder from a resin of polymethylpentene. In one aspect, the conductive additive is comprised of graphite, graphene oxide, carbon nanotubes, or carbon nanowires. In one aspect, the conductive host-additive particle is formed into a bipolar plate assembly for a PEM fuel cell, and the bipolar plate comprises a formable resin with one or more conductive materials. In one aspect, the conductive host-additive particle is formed into a bipolar plate assembly for a PEM fuel cell that comprises the bipolar plate having a plurality of formed serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field. In one aspect, the conductive host-additive particle is formed into a bipolar plate assembly for a PEM fuel cell that comprises a first seal disposed on said second side of said bipolar plate and having a first passageway formed therein to define a first fluid transmission path between said first header and a second passageway formed therein to define a second fluid transmission path between said second port and said interdigitated flow field. In one aspect, the conductive host-additive particle is formed into a bipolar plate assembly for a PEM fuel cell comprises a second seal disposed on said first side of said bipolar plate and having a third passageway formed therein to define a third fluid communication path from said second header to said second port and a fourth passageway formed therein to define a fourth fluid communication path from said first port to said serpentine flow field. In one aspect, the powdered host particle is a powder from any resin of a particle size greater than 5 µm. In one aspect, the powdered host particle is a powder from a resin of polymethylpentene. In one aspect, the conductive additive is comprised of graphite, graphene oxide, carbon nanotubes or carbon nanowires or any combination formed in situ in the ball mill prior to the addition of the powdered host particle.

Another embodiment of the present invention includes a method of making a conductive composite particle or material, comprising: providing a powdered host particle; providing a conductive additive with a softening or melting temperature higher than the melting point of the powdered host particle; mixing the powdered host particle and the powdered additive in a ball mill; and milling the powdered host and the powdered additive for a time sufficient to mix but not melt the powdered host particle to form an electrically conductive host-additive blend. In one aspect, the powdered host particle is a powder from a resin of polymethylpentene. In another aspect, the electrically conductive host-additive blend has at least one of the following properties: a bulk density less than 1.75 g/cm$^3$, an electrical conductivity greater than 250 S/cm, or a Rockwell hardness >80. In another aspect, the method further comprises the step of extruding, stamping, or otherwise mass-producing the electrically conductive host-additive blend into a bipolar plate. In another aspect, the bipolar plate is adapted for use in a PEM fuel cell, wherein the bipolar plate further comprises a formable resin with one or more conductive additives. In another aspect, the method further comprises the step of assembling the bipolar plate into a PEM fuel cell that comprises the bipolar plate having a plurality of formed serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field. In another aspect, the method further comprises the step of assembling the bipolar plate into a PEM fuel cell comprises a first seal disposed on said second side of said bipolar plate and having a first passageway formed therein to define a first fluid transmission path between said first header and a second passageway formed therein to define a second fluid transmission path between said second port and said interdigitated flow field. In another aspect, the method further comprises the step of assembling the bipolar plate into a PEM fuel cell comprises a second seal disposed on said first side of said bipolar plate and having a third passageway formed therein to define a third fluid communication path from said second header to said second port and a fourth passageway formed therein to define a fourth fluid communication path from said first port to said serpentine flow field. In another aspect, the powdered host particle is a powder from any resin of a particle size greater than 5 μm. In another aspect, the conductive additive is comprised of graphite, graphene oxide, carbon nanotubes, carbon nanowires or any combination.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are illustrative of ways to make and use the invention and do not delimit the scope of the invention.

As used herein, the term "graphene" refers to a polycyclic hexagonal lattice with carbon atoms covalently bonded to each other. The covalently bonded carbon atoms can form a six-member ring as a repeating unit, and may also include at least one of a five-member ring and a seven-member ring. Multiple graphene layers are referred to in the art as graphite. Thus, graphene may be a single layer, or also may comprise multiple layers of graphene that are stacked on other layers of graphene yielding graphene oxide. Generally, graphene oxide can have a maximum thickness of about 100 nanometers (nm), specifically about 0.5 nm to about 90 nm.

As used herein, the term "graphene oxide flake" refers to a crystalline or "flake" form of graphene oxide that has been oxidized and includes many graphene sheets oxidized and stacked together and can have oxidation levels ranging from 0.01% to 25% by weight in ultra pure water. The flakes are preferably substantially flat.

As used herein, the term "PEM fuel cell" refers to a proton exchange membrane fuel cell, but also referred to as a polymer electrolyte membrane (PEM) fuel cell that converts, e.g., hydrogen and ambient air into water and an electrical current. The present invention finds particular uses in PEM fuel cells.

Graphite, graphene oxide, carbon nano tubes/fiber, and carbon black are collectively known as conductive components. Undoped TPX® Polymethylpentene (PMP) characteristics include electrical insulating properties and strong hydrolysis resistance (TPX® is a registered trademark to Mitsui Chemical). The TPX particles can be subjected to mechanochemical processing in what is generically referred to as a "ball mill." The TPX has a particle size greater than or equal to 2 μm. When grinding in the ball mill, the balls (media) in their random movement are rolling against each other and the container, exerting shearing forces on the carbon black and the TPX particles. The resulting TPX particles can be coated on the exterior and have not been melted nor has the particle's size been reduced by more than 20% due to the milling process.

A useful and simple equation describing the grinding momentum is m×v (mass×velocity), which enables a calculation of how the attrition mill fits into the family of mills. For example, a 2-liter ball mill uses 6 lbs (or ~2600 stainless steel balls) of 0.25" diameter stainless steel balls weighing 1 g each. Milling or mixing can be accomplished in a closed chamber for 10 to 100 minutes at 1,000 RPM or less to coat the host particles. The other mills, such as sand, bead, and horizontal, use smaller media from 0.3 mm to 2 mm, but run at a very high rpm (roughly 100-1000). High-speed dispersers with no media run at an even faster rpm (1000-4000). An attrition mill directly agitates the media to achieve grinding.

For efficient fine grinding, both impact action and shearing force are generally required. The grinding media's random movement and spinning at different rotational energies exert shearing forces and impact forces on the carbon black and host particles. The milling/mixing time may range from 5 to 60 minutes. The combination of milling/mixing speed, media size and milling/mixing time enables the production of a host particle covered with conductive additives. The conductive composition of the composite can vary relative to each other but we have found a ratio of "77:3:10" (graphite:GO:TPX) exhibits the outstanding properties. By controlling the ratio of components, unique properties can be achieved such as a bulk density less than 1.75 g/cm$^3$, electrical conductivity greater than 250 S/cm, and Rockwell hardness >80.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. In certain embodiments, the present invention may also include methods and compositions in which the transition phrase "consisting essentially of" or "consisting of" may also be used.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a conductive, composite bipolar plate made of coated particles for making a composite material that enhances a property of the composite material, comprising:
   providing a powdered component called a powdered host particle, wherein the powdered host particle is a powder from a resin of polymethylpentene;
   providing a second powdered component called a conductive additive that comprises a softening or melting temperature higher than the melting point of the powdered host particle, wherein the conductive additive comprises substantially flat graphene oxide flakes, and wherein the conductive additive is formed in situ in a ball mill prior to the addition of the powdered host particle;
   inputting said powdered host particle into the ball mill; and
   ball milling said powdered host and said conductive additive for a milling time to sufficiently mix but not melt the powdered host particle into a conductive host-additive particle.

2. The method of claim 1, wherein the conductive host-additive particle is formed into a bipolar plate assembly for a PEM fuel cell, and the bipolar plate comprises a formable resin with one or more conductive materials.

3. The method of claim 1, wherein the conductive host-additive particle is formed into a bipolar plate assembly for a PEM fuel cell that comprises the bipolar plate having a plurality of formed serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field.

4. The method of claim 1, wherein the conductive host-additive particle is formed into a bipolar plate assembly for a PEM fuel cell that comprises a first seal disposed on said second side of said bipolar plate and having a first passageway formed therein to define a first fluid transmission path between said first header and a second passageway formed therein to define a second fluid transmission path between said second port and said interdigitated flow field.

5. The method of claim 1, wherein the conductive host-additive particle is formed into a bipolar plate assembly for a PEM fuel cell comprises a second seal disposed on said first side of said bipolar plate and having a third passageway formed therein to define a third fluid communication path from said second header to said second port and a fourth passageway formed therein to define a fourth fluid communication path from said first port to said serpentine flow field.

6. A method of making a conductive composite particle or material, comprising:
   providing a powdered host particle, wherein the powdered host particle is a powder from a resin of polymethylpentene;
   providing a conductive additive with a softening or melting temperature higher than the melting point of the powdered host particle, wherein the conductive additive comprises substantially flat graphene oxide flakes, and wherein the conductive additive is formed in situ in a ball mill prior to the addition of the powdered host particle;
   mixing the powdered host particle in the ball mill; and
   milling the powdered host and the powdered additive for a time sufficient to mix but not melt the powdered host particle to form an electrically conductive host-additive blend.

7. The method of claim 6, wherein the electrically conductive host-additive blend has at least one of the following properties: a bulk density less than 1.75 g/cm$^3$, an electrical conductivity greater than 250 S/cm, or a Rockwell hardness >80.

8. The method of claim 6, further comprising the step of extruding, stamping, or otherwise mass-producing the electrically conductive host-additive blend into a bipolar plate.

9. The method of claim 8, wherein the bipolar plate is adapted for use in a PEM fuel cell, wherein the bipolar plate further comprises a formable resin with one or more conductive additives.

10. The method of claim 8, further comprising assembling the bipolar plate into a PEM fuel cell that comprises the bipolar plate having a plurality of formed serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field.

11. The method of claim 10, further comprising assembling the bipolar plate into a PEM fuel cell comprises a first seal disposed on said second side of said bipolar plate and having a first passageway formed therein to define a first fluid transmission path between said first header and a second passageway formed therein to define a second fluid transmission path between said second port and said interdigitated flow field.

12. The method of claim 10, further comprising assembling the bipolar plate into a PEM fuel cell comprises a second seal disposed on said first side of said bipolar plate and having a third passageway formed therein to define a third fluid communication path from said second header to said second port and a fourth passageway formed therein to define a fourth fluid communication path from said first port to said serpentine flow field.

* * * * *